United States Patent [19]
Geisthoff

[11] Patent Number: 4,781,652
[45] Date of Patent: Nov. 1, 1988

[54] LUBRICATION ARRANGEMENT FOR HOOKES JOINT

[75] Inventor: Hubert Geisthoff, Lohmar, Fed. Rep. of Germany

[73] Assignee: Jean Walterscheid GmbH, Fed. Rep. of Germany

[21] Appl. No.: 41,677

[22] Filed: Apr. 21, 1987

[30] Foreign Application Priority Data

May 17, 1986 [DE] Fed. Rep. of Germany ....... 3616810

[51] Int. Cl.$^4$ .............................................. F16D 3/41
[52] U.S. Cl. .................................................... 464/14
[58] Field of Search .................. 403/57, 58; 464/11, 464/13, 14, 136

[56] References Cited

U.S. PATENT DOCUMENTS 4,445,875  5/1984  Kosuda et al. ..................... 464/14
4,478,591  10/1984  Mangiavacchi ..................... 464/14

FOREIGN PATENT DOCUMENTS 2066925  7/1981  United Kingdom ................. 464/14

Primary Examiner—Daniel P. Stodola
Attorney, Agent, or Firm—Toren, McGeady & Associates

[57] ABSTRACT

A Hookes joint comprising a cross member (10) and yokes (12) has respective lubricant bores (22, 24 and 26, 28) formed in journals (14, 16 and 18, 20) of the cross member. Leaf springs (48, 50) are located within the respective throughbores to project outwardly of the ends thereof into nonrotatable engagement with bearing cups (30, 32), each nonrotatably secured within ends of a yoke. Each bearing cup permits rotation of an associated cross member journal therein whereby, upon relative rotation between the cross member and a yoke, a respective leaf spring (48 or 50) rotates within the throughbore (22, 24 or 26, 28) causing a wiping or sweeping action of the spring within the lubricant in the bore thereby ensuring that the bore does not become constricted. Uniform distribution of lubricant to the bearing cups is thereby assured.

11 Claims, 1 Drawing Sheet

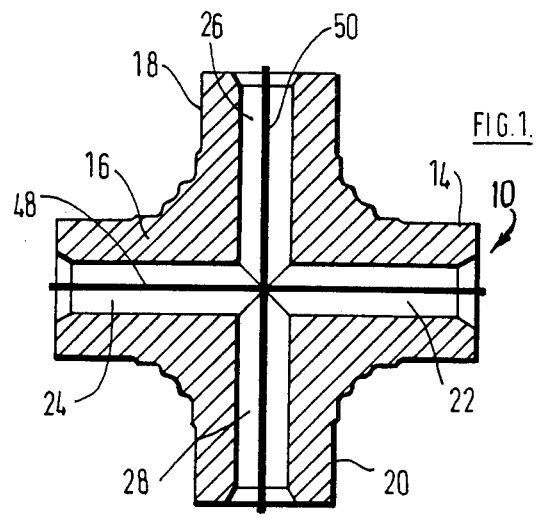
FIG.1.
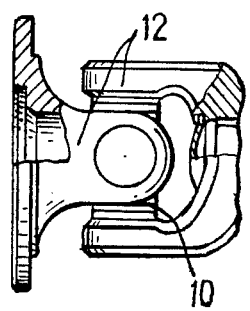
FIG.7.
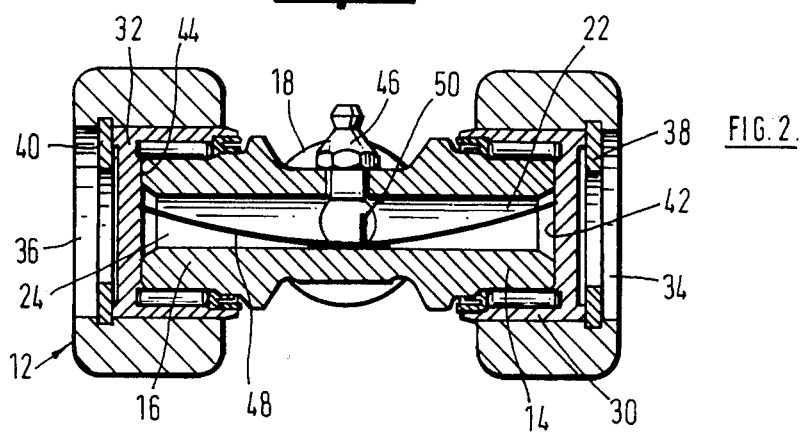
FIG.2.
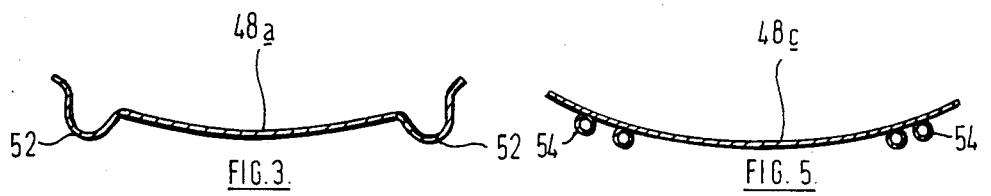
FIG.3.
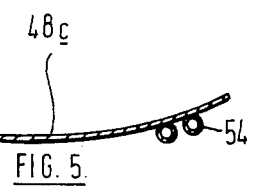
FIG.5.
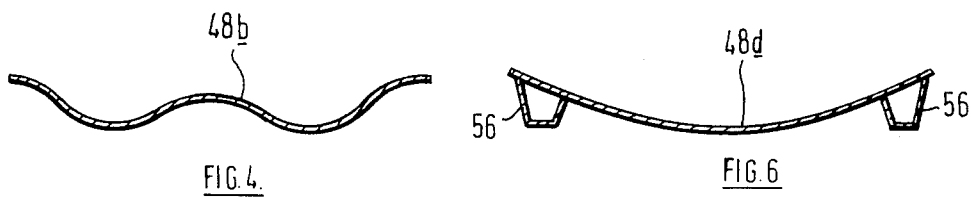
FIG.4.
FIG.6.

LUBRICATION ARRANGEMENT FOR HOOKES JOINT

BACKGROUND OF THE INVENTION

1. Field of the Invention

This invention relates to a Hookes joint which is a joint usable between shafts permitting rotational drive to be imparted from one shaft via the joint to another shaft whilst permitting variation of alignment between the driving and driven shafts. A Hookes joint comprises a cross member and two yokes, one of which yokes is typically connected to a driving shaft and wherein the other yoke is typically connected to a driven shaft such as in, for example, a vehicle propeller shaft drive train or in a power take-off drive train of an agricultural tractor. The cross member has four radially extending journals arranged in two pairs thereof, the journals in each one of said two pairs being coaxial with one another and the axes of the two pairs of journals being perpendicular to one another, the journals of one said pair thereof being rotatably mounted in bearing assemblies in corresponding ends of one said yoke and the journals of the other said pair thereof being rotatably mounted in bearing assemblies in corresponding ends of the other said yoke.

2. Description of Prior Art

Lubrication of the bearing assemblies within the joint has been proposed to be accomplished by the provision of bores within the cross member journals for the distribution of lubricant out of the open ends of the bores to the bearing assemblies. It has been proposed to distribute lubricant to the bearing assemblies via a single lubricant nipple on the cross member which communicates internally of the cross member with all of the bores in the journals. For example, in DE-A No. -28 41 955 it has been proposed to connect the four lubricant bores in series relationship by appropriately arranged conduits within the cross member in such manner that lubricant can be fed from a single lubricating nipple in series from one bearing assembly to another.

In such an arrangement, the means for distributing the lubricant is complex and requires the incorporation of various conduits and closure means resulting in a joint which is expensive to manufacture. Furthermore, such a distribution of lubricant in series from one bearing assembly to another cannot readily result in uniform supply of lubricant to each bearing assembly. The arrangement also suffers from a disadvantage that plugs or clots of dried lubricant may constrict the lubricant bores thus further reducing uniform distribution of lubricant to the bearing assemblies.

SUMMARY OF THE INVENTION

It is an object of the present invention to provide a Hookes joint incorporating means for facilitating uniform distribution of lubricant to the bearing assemblies.

In accordance with the invention there is provided a Hookes joint comprising a cross member and two yokes, the cross member having four radially extending journals arranged in two pairs, the journals in each one of said two pairs thereof being coaxial with one another and the axes of the two pairs of journals being perpendicular to one another, the journals of one said pair thereof being rotatably mounted in bearing assemblies in corresponding ends of one said yoke and the journals of the other said pair thereof being rotatably mounted in bearing assemblies in corresponding ends of the other said yoke; the cross member having a lubricant bore extending longitudinally of each journal and having an open end for distributing lubricant to an associated bearing assembly; and displacement means within each said bore rotatable with the yokes relative to the cross member whereby, upon relative rotation between a yoke and the cross member, a displacement means is rotated relative to the bore within which it is located.

The rotation of the displacement means relative to the bore within which it is located causes a wiping or sweeping action of the displacement means within the lubricant in the bore thereby ensuring that the bore does not become constricted in any way which would interfere with the uniform distribution of lubricant to the bearing assemblies.

Preferably the bore in each said pair of journals comprises a through bore extending from the end of one journal of the said pair to the end of the other journal of the said pair, and a said displacement means extends through said through bore.

Said displacement means conveniently comprises a leaf spring located within each said through bore and having ends projecting beyond the corresponding ends of the through bore in which it is located in non-rotatable engagement relative to the yoke.

The said ends of each leaf spring are preferably non-rotatably engaged with a part of a bearing assembly within which the corresponding journal of the cross member is rotatably mounted, said bearing assembly itself being non-rotatably secured in a corresponding bore in a yoke, and said part of the bearing assembly conveniently comprises an end face of a bearing cup comprising the bearing assembly.

Each leaf spring may be shaped to provide enhanced displacement properties of the spring upon its rotation within a said through bore; thus, for example, each leaf spring may be of sinusoidal configuration and/or may have projections attached thereto or be further shaped all for enhancing the displacement properties of the spring upon its rotation.

The spring may be formed of a metal such as steel or may be formed of a plastics material.

BRIEF DESCRIPTION OF DRAWING

Further features of the invention will become apparent from the following description given herein solely by way of example with reference to the accompanying drawings wherein:

FIG. 1 is a cross sectional view through a cross member of a Hookes joint constructed in accordance with the invention showing a leaf spring displacement means located within each of the lubricant bores of the cross member journals;

FIG. 2 is a cross sectional view through an assembled Hookes joint constructed in accordance with the invention, the view being taken at right angles to that shown in FIG. 1;

FIG. 3 is a diagrammatic view of a variation of the leaf spring displacement means shown in FIGS. 1 and 2;

FIG. 4 is a diagrammatic view of a further variation of the leaf spring;

FIG. 5 is a diagrammatic view of a yet further variation of the leaf spring; and FIG. 6 is a diagrammatic view of a still further variation of the leaf spring; and FIG. 7 is a partial side view of a Hookes joint with two yokes.

DESCRIPTION OF PREFERRED EMBODIMENTS

Referring to FIGS. 1 and 2 of the drawings there is shown a Hookes joint constructed in accordance with the invention comprising, in the usual manner, a cross member 10 and two yokes, one only of which yokes 12 is visible in FIG. 2. The cross member 10 comprises four radially extending integral journals 14, 16, 18 and 20 of generally cylindrical form arranged in two pairs thereof, the journals 14, 16 and 18, 20 in each one of said two pairs being coaxial with one another and the axes of the two pairs of journals being perpendicular to one another. Each of the journals 14, 16, 18, 20 is formed with a respective central bore 22, 24, 26, 28 opening at one end at the outer end of each respective journal and communicating with the other bores at its inner end. Thus, as will be clearly seen from FIGS. 1 and 2, the respective bores 22, 24 and 26, 28 in the journals 14, 16 and 18, 20 in each said pair thereof comprise a through bore extending from the end of one journal of the pair to the end of the other journal of the pair.

In the assembled joint shown in FIG. 2, it will be seen that the ends of the journals 14, 16 are received in respective bearing cups 30, 32 each of which is non-rotatably mounted in a respective bore 34, 36 at an end of each yoke; the bearing cups being retained within their respective yoke bores by suitable bore closure means 38 and 40. Only the one pair of journals 14, 16 and respective bearing cups 30 and 32 are visible in FIG. 2. Each bearing cup 30, 32 includes a respective end face 42, 44 perpendicular to the axis of its associated journal and an annular cup containing, for example, a needle roller bearing assembly within which a journal is freely rotatable.

Also as can be clearly seen from FIG. 2, the cross member includes a single central lubricating nipple 46 the inner end of which communicates with each of the wwo through bores 22, 24 and 26, 28 whereby lubricant may be uniformly distributed through such bores out of the ends of the associated journals to lubricate the bearing assemblies.

In accordance with the invention, displacement means are provided within each of the journal bores and, in FIGS. 1 and 2, such displacement means comprises a pair of leaf springs 48 and 50 each having a length slightly in excess of the length of the respective through bore 22, 24 and 26, 28 within which it is located so as to project beyond the ends of the respective journals into contact and engagement with the end faces of the respective bearing cups. Thus, as can be seen in FIG. 2, each leaf spring is constrained to take up a bowed configuration with each projecting end of the leaf spring 48 non-rotatably engaged with an associated end face 42 and 44 of a bearing cup by, for example, friction which can be enhanced by providing a sharpened end to the leaf spring 48 or by engagement of the ends of the leaf spring within cooperating retaining recesses within the end faces 42 and 44 of the bearing cup. Thus it will be appreciated that, upon relative rotation between the journals 14, 16 and the yoke 12 shown in FIG. 2, the leaf spring 48 will be caused to rotate within the through bore 22, 24 within which it is located due to the non-rotatable engagement of the ends of the spring with the end faces 42, 44 of the bearing cups which are themselves non-rotatably mounted within the yoke bores 34 and 36. This rotation of the leaf spring 48 within its associated through bore 22, 24 causes a wiping or sweeping displacement action of the spring within the lubricant in the bore thereby ensuring that the bore does not become constricted in any way which would interfere with the uniform supply of lubricant from the nipple 46 to each of the bearing assemblies. It will be appreciated that a similar action of the spring 50 occurs within the through bore 26, 28 upon relative rotation between the journals 18, 20 and the other yoke of the joint.

FIGS. 3 to 6 of the drawings show variations in the shapes of the leaf springs 48 or 50, which springs can be formed either of a metal such as spring steel, shown in FIGS. 3, 5 and 6 or of a plastics material, as shown in FIG. 4. In FIG. 3 there is shown a shape of spring 48a wherein the ends 52 thereof are crimped whilst in FIG. 4 the leaf spring 48b is shown as being of a sinusoidal configuration. The spring 48c shown in FIG. 5 is provided with a pair of convolutions 54 adjacent each of its ends whilst the spring 48d shown in FIG. 6 is provided with separate projections 56 extending therefrom. All of the variations shown in FIGS. 3 to 6 are for the purpose of enhancing the wiping or sweeping displacement properties of the spring during its rotation within the bore within which it is located thereby to ensure uniform supply of lubricant to the bearing assemblies as mentioned above.

I claim:

1. A lubrication arrangement for a Hookes joint comprising a cross member and two yokes, the cross member having four radially extending journals arranged in two pairs, the journals in each one of said two pairs thereof being coaxial with one another and the axes of the two pairs of journals being perpendicular to one another, the journals of one said pair thereof being rotatably mounted in bearing assemblies in corresponding ends of one said yoke and the journals of the other said pair thereof being rotatably mounted in bearing assemblies in corresponding ends of the other said yoke; the cross member having a lubricant bore extending axially of each journal and having an open end at the associated said bearing assembly for distributing lubricant to the associated bearing assembly; and displacement means within and extending axially through each said bore rotatable with the bearing assemblies and yokes relative to the cross member for providing uniform unimpeded flow of the lubricant through the bore whereby, upon relative rotation between a yoke and the cross member, the displacement means is rotated relative to the bore within which it is located.

2. A lubrication arrangement for a Hookes joint as claimed in claim 1, wherein the bores in each said pair of journals comprise a through bore extending from the end of one journal of the said pair to the end of the other journal of the said pair, and a said displacement means extends through said through bore.

3. A lubrication arrangement for a Hookes joint as claimed in claim 2, wherein said displacement means comprises a leaf spring located within each said through bore and having ends projecting beyond the corresponding ends of the through bore in which it is located in non-rotatable engagement relative to the yoke.

4. A lubrication arrangement for a Hookes joint as claimed in claim 3, wherein said ends of each spring are nonrotatably engaged with a part of the associated said bearing assembly within which the corresponding journal of the cross member is relatively rotatably mounted.

5. A lubrication arrangement for a Hookes joint as claimed in claim 4, wherein said bearing assembly comprises a bearing cop nonrotatably mounted in a corresponding bore in a yoke, said part of the bearing assembly comprising an end face thereof.

6. A lubrication arrangement for a Hookes joint as claimed in any one of claims 3, 4, or 5, wherein each end of each leaf spring is shaped at its ends to provide enhanced displacement properties of the spring upon its rotation within the associated said throughbore.

7. A lubrication arrangement for a Hookes joint as claimed in any one of claims 3, 4, or 5, wherein each leaf spring is of sinusoidal configuration to provide enhanced displacement properties of the spring upon its rotation within the associated said throughbore.

8. A lubrication arrangement for a Hookes joint as claimed in any one of claims 3, 4, or 5, wherein each leaf spring includes attachments shaped to provide enhanced displacement properties of the spring upon its rotation within the associated said throughbore.

9. A lubrication arrangement for a Hookes joint as claimed in any one of claims 3, 4, or 5, wherein the leaf spring is formed of steel.

10. A lubrication arrangement for a hookes joint as claimed in any one of claims 3, 4, or 5, wherein the leaf spring is formed of a plastics material.

11. A lubrication arrangement for a Hookes joint as claimed in any one of claims 3, 4, or 5, wherein each end of each leaf spring is shaped adjacent its ends to provide enhanced displacement properties of the spring on its rotation within the associated said throughbore.

* * * * *